Sept. 26, 1967  A. R. BAKER  3,343,765

SEAT BELT RETRACTOR

Filed Nov. 19, 1965

INVENTOR.

Arthur R. Baker

BY Paul Fitzpatrick

ATTORNEY

United States Patent Office 3,343,765
Patented Sept. 26, 1967

3,343,765
SEAT BELT RETRACTOR
Arthur R. Baker, Oxford, Mass., assignor to General Motors Corporation, Detroit, Mich., a corporation of Delaware
Filed Nov. 19, 1965, Ser. No. 508,773
3 Claims. (Cl. 242—107.4)

ABSTRACT OF THE DISCLOSURE

A vehicle body is provided with a pair of straps which may be coupled together to form a continuous seat belt adjacent a vehicle seat. One end of one of the straps is mounted to the vehicle floor while the other end of the other strap is fastened to a retractor which is mounted on the vehicle floor. The latter strap end is secured to a peripherally-toothed retractor reel that is rotatably mounted on a yoke member pivotally mounted on a retractor support. An inertia-responsive member is responsive to a change in vehicle velocity to pivot a yoke-mounted locking member into engagement with the reel teeth to lock the reel. The reel teeth are engageable with a portion of the support upon pivotal movement of the locked reel and yoke against the force of a retaining spring.

This invention relates to a seat belt retractor for automatically retracting a seat belt when not in use and for automatically locking the seat belt under predetermined conditions.

Conventionally, a seat belt comprises a pair of belt straps secured to the vehicle on either side of the passenger's seat and adapted to be snugly fastened together around the passenger. A snug belt prevents the passenger from making such ordinary movements as reaching into the glove compartment or into the rear seat or removing change from his pockets. Various devices have been proposed for retracting the belt when not in use, while permitting the passenger a certain amount of freedom of movement while the belt is in use. These devices include means for automatically locking the seat belt in position when the vehicle is subjected to rapid changes in direction or velocity. The present invention represents an improvement in such devices.

The retractor according to this invention comprises a reel rotatably mounted on a yoke which is pivoted to a body-mounted support, an inertia-responsive member mounted on the yoke and operable to effect locking of the reel to the yoke, and means mounted on the reel engageable with a portion of the support to lock the reel to the support upon pivotal movement of the locked reel and yoke in response to tension on the seat belt strap.

More specifically, the present invention provides a seat belt retractor including a minimum number of parts which are easily assembled comprising a spool which is rotatably mounted in a yoke which is pivotally mounted on a support member secured to the vehicle. Means are provided for quickly and easily coupling one end of the seat belt to the reel and a spring motor is provided for normally rotating the reel in a direction to wind the seat belt thereon. The reel is further provided with toothed wheels adapted to be engaged by a locking member actuated by a pendulum device when a sudden force is applied to the seat belt to prevent rotation of the reel in an unwinding direction.

A more complete understanding of the present invention may be had from the following detailed description which should be taken in conjunction with the drawings in which.

Figure 1:
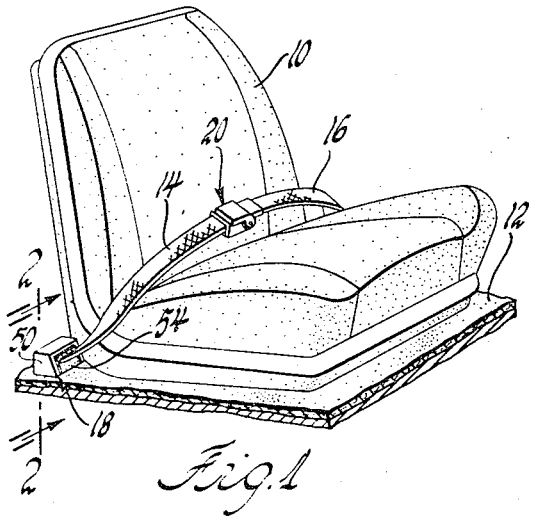
FIGURE 1 is a perspective view of the retractor of the present invention mounted in a motor vehicle.

Referring now to the drawings and initially to FIGURE 1, the reference numeral 10 designates an automobile seat suitably mounted to the vehicle floor 12. A seat belt assembly comprises a pair of seat belt straps 14 and 16. Strap 14 is coupled at one end to a retractor according to this invention generally designated 18, while one end of strap 16 is mounted on floor 12 by means not shown. The opposite ends of the straps are suitably secured to cooperating buckle members generally designated 20.

Referring now to FIGURES 2–5, the seat belt retractor 18 comprises a support member 22 which is suitably secured to the vehicle floor 12 and includes arcuate support surfaces 24. A U-shaped support member or yoke 26 including arms 28 extending from an arcuate shaped portion 30 is adapted for pivotal movement relative to the support member 22 by rocking and sliding engagement of the portion 30 with the surfaces 24. A hollow reel 32 is rotatably supported by the yoke 26 and includes a pair of toothed wheels 34 suitably attached thereto or forming an integral part thereof. The belt strap 14 extends through a slot 36 in the reel 32 and is adapted to receive a belt retaining pin 38 which is supported within the reel 32 by circular spacers 40. The toothed wheels 34 are engageable with the periphery of slots 41 in the support member 22 when the yoke 26 is pivoted on portion 30.

Figure 2:
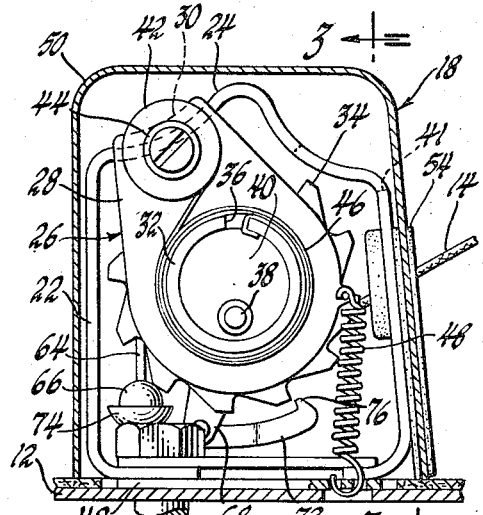
FIGURE 2 is a sectional view taken along lines 2—2 of FIGURE 1.
Figure 3:
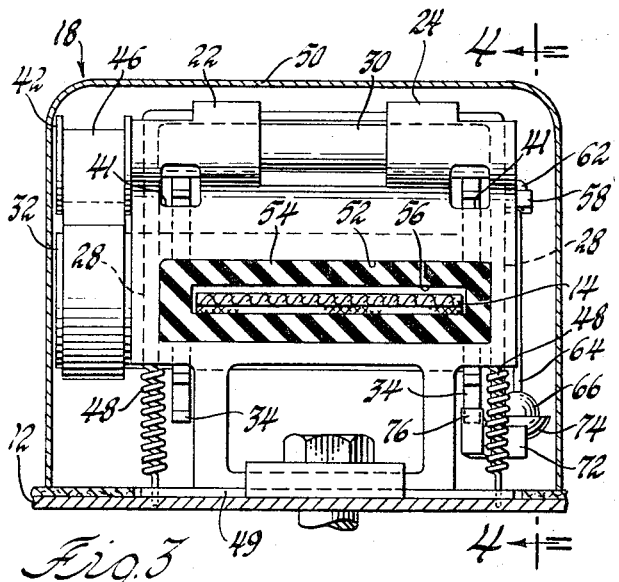
FIGURE 3 is a sectional view taken along lines 3—3 of FIGURE 2.
Figure 4:
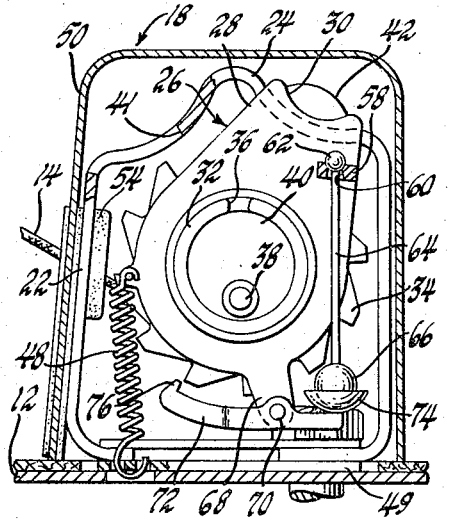
FIGURE 4 is a sectional view taken along lines 4—4 of FIGURE 3 showing the retractor in the normal position.
Figure 5:
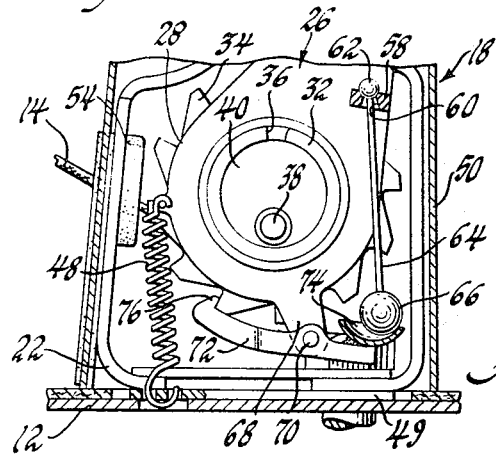
FIGURE 5 is the same view as FIGURE 4 showing the retractor in the locked position.

As best shown in FIGURES 2 and 3, a spool 42 is rotatably mounted on a pin 44 which is secured to the yoke 26. A spring 46 is prestressed so as to tend to coil itself tightly around the spool 42. The outer end of the spring 46 is secured to the reel 32 and is arranged to be reversely wound thereon. A pair of coil springs 48 connected between the yoke 26 and the base plate 49, which is sandwiched between the support member 22 and the floor 12, normally maintains the yoke 26 in the position shown in FIGURE 2. A housing 50 is adapted to be received over the support member 22 to form an enclosure for the retractor. The support member 22 and the housing 50 are provided with aligned openings 52. A guide member 54 is adapted to be received in the openings 52 and includes a slot 56 through which the belt strap 14 passes.

A flange 58 extends from one of the arms 28 of the yoke 26 and has a substantially vertical aperture 60 cut therethrough. The upper portion of the aperture 60 is rounded so as to form a socket for a ball 62. A rod 64 extends from the ball 62 at one end through the aperture 60 and terminates in a ball weight 66 at its other end. This assembly thus effectively forms a ball joint suspended pendulum.

A tab 68 extends from the lower end of the arm 28 of yoke 26 and contains a pivot pin 70. A lever 72 is pivotally mounted on the pin 70 and has a saucer 74 mounted on its one end and terminates in a toothed wheel engaging flange 76 at its other end. The ball weight 66 resides in the saucer 74 and reacts to any change in direction or velocity of the vehicle by pushing down on the edge of the saucer 74 which in turn pivots the lever 72 and moves the flange 76 into locking contact with the toothed wheel 34.

The operation of the device is as follows. The spring 46 normally tends to rotate the reel 32 in a clockwise or winding direction as viewed in FIGURE 2. Unwinding of the reel 32 is accomplished by tensioning the belt strap 14 sufficiently to oppose the rewinding force of spring 46.

During normal unwinding of belt strap 14 and under normal movement of the vehicle passenger, the tension of the springs 48 is sufficient to prevent pivoting of the yoke 26 through an angle sufficient to cause engagement of the toothed wheels 34 with the support member 22. Thus the reel 32 may be freely rotated in an unwinding direction by passenger movement forward and will be freely rewound by spring 46 by such movement backward.

The pendulum ball weight 66 is inertia responsive, being sensitive to changing velocity and/or changing direction of the vehicle. Because of its inertia the ball weight will move in a direction opposite that of the velocity change or the travel direction change. This motion of the ball weight will depress the saucer 74 thereby pivoting the lever 72 and causing the flange 76 to engage one tooth on the toothed wheel 34 and lock the wheel against rotation relative to the yoke. This locks reel 32 and prevents any unwinding of the belt 14. In this reel locked condition, any force on the belt 14 greater than the resisting force of the springs 48 will cause the yoke 26 to pivot on portion 30 until the toothed wheels engage the periphery of slots 41 in the support member 22. This further locks reel 32 against rotation in counterclockwise or unwinding direction.

Thus this invention provides a retractor which permits unrestrained normal passenger movement, but securely locks upon rapid changes in vehicle velocity. While the invention has been described with respect to a particular embodiment, it is not to be construed in a limiting sense. Many variations and modifications within the spirit and scope of the invention will now occur to those skilled in the art.

I claim:

1. In combination with a vehicle body having a seat belt strap, a retractor for said strap comprising, a support member mounted on said body and including stop means, a yoke member pivotally mounted on said support member, means retarding pivotal movement of said yoke member in a direction toward the stop means, a reel rotatably mounted on said yoke member and secured to one end of said strap, locking means mounted on the reel for rotation therewith, resilient means urging said reel to rotate in one direction to wind said strap thereon, a locking member mounted on said yoke and engageable with said locking means to lock said reel to said yoke against movement in the other direction to unwind said strap, and an inertia responsive member mounted on said yoke and operative to move said locking member into engagement with said locking means to lock said reel to said yoke so that tension on said strap effects pivotal movement of said yoke toward said stop to engage said stop means.

2. The combination of claim 1, wherein said inertia responsive member is a pendulum mounted on said support and said locking member is a lever pivotally mounted on said yoke, said pendulum being operative to pivot said lever into engagement with said locking means to lock said reel against rotation in said other direction.

3. The combination of claim 2, wherein said locking means include a plate having peripheral teeth mounted on said reel for rotation therewith, said teeth being engageable with said stop means upon pivotal movement of said yoke member, said lever including a locking flange engageable with said teeth.

References Cited

UNITED STATES PATENTS

| | | | |
|---|---|---|---|
| 2,650,655 | 9/1953 | Neahr et al. | 242—107.4 X |
| 3,138,405 | 6/1964 | Hanway | 242—107.4 X |
| 3,203,641 | 8/1965 | McFarlane et al. | 242—107.4 |
| 3,226,053 | 12/1965 | Petty | 242—107.4 |
| 3,237,879 | 3/1966 | Whittingham | 242—107.4 |
| 3,240,510 | 3/1966 | Spouge | 242—107.4 |
| 3,273,822 | 9/1966 | Merrell et al. | 242—107.4 |

FRANK J. COHEN, *Primary Examiner.*

W. S. BURDEN, *Assistant Examiner.*